Patented Nov. 10, 1942

2,301,253

UNITED STATES PATENT OFFICE 2,301,253

COMPOSITION OF MATTER AND METHOD AND STEP OF MAKING AND USING THE SAME

Solomon Caplan, New York, N. Y., assignor, by mesne assignments, to Harvel Research Corporation, a corporation of New Jersey No Drawing. Application June 3, 1937
Serial No. 146,207

6 Claims. (Cl. 260—97)

The present invention relates to polymerized shellac and to compositions containing polymerized shellac, and the present invention also relates to methods and steps for making and using polymerized shellac.

According to the present invention shellac is polymerized with an agent such as sulphuric acid, phosphoric acid, zinc chloride, diethyl sulphate, dimethyl sulphate or other dialkyl sulphate or an aromatic sulphate such as phenyl sulphate or mixed, dihydrocarbon sulphate such as ethyl methyl sulphate or ethyl phenyl sulphate, acid mono methyl sulphate, acid mono ethyl sulphate or other acid mono alkyl sulphate, acid mono aromatic sulphate such as acid mono phenyl sulphate.

As one illustrative example of the practice of the methods of the present invention and of the product thereof the following is given. About ten pounds of shellac are dissolved in three gallons of ethyl alcohol and 0.8 pound of cencentrated sulphuric acid added and dissolved in the solution, after which the whole is heated to about 80° C. for about 5 hours under a reflux condenser after which the alcohol is removed by further heating. The resulting polymerized shellac, which is a rubbery mass, can be washed and neutralized and dried and then milled into rubber and is valuable for use in rubber to give to the latter oil and solvent resistance. Suitable proportions of shellac polymer to rubber, given here as illustrative example are from about 1 part to about 5 parts of shellac polymer to 1 part of rubber.

Suitable proportion of sulphuric acid to shellac are from about one-half part, or less by weight to about ten parts by weight of sulphuric to one hundred parts by weight of shellac.

In place of using sulphuric acid as in the above example an alkyl sulphate can be used, for example, diethyl ethyl sulphate in amount from about one-half part by weight or less to about ten parts by weight for each hundred parts by weight of shellac to be polymerized. The diethyl sulphate or other hydrocarbon sulphate can be used without a solvent, being miscible with shellac when the latter is heated to bring it into the liquid condition.

Also a solvent can be used which is also a plasticiser or enters into the reaction for the polymerized shellac, for example, ethylene glycol or diethylene glycol. The following is an example of the polymerization of shellac with diethylene glycol and the use of the latter in and with the shellac polymer as a modifying composition for rubber.

| | Pounds |
|---|---|
| Delta shellac | 10 |
| Diethylene glycol | 4 |
| Diethyl sulfate | 0.3 |

The mixture of shellac and diethylene glycol was heated to 250° F. until a homogeneous mixture resulted whereupon the diethyl sulfate was stirred in. This mixture was placed in an oven at 270° F. for 16 hours and the resulting rubbery mass was washed on a rubber mill with water. It was then sheeted out and again placed in the oven at 150° F. for removal of residual moisture. This material can be worked on the rubber mill, with or without the addition of rubber, and is unaffected by $H_2O$ or petroleum hydrocarbons.

The proportions of shellac and diethylene glycol can be varied widely depending on the degree of softness desired.

Shellac alone, that is, with a material such as diethylene glycol, heated with diethyl sulfate (particularly if the shellac is in alcohol solution to start with) gives a rubbery mass which tends to crumble and which works well into rubber on the mixing rolls. Quantities of diethyl sulfate up to 10% of the weight of the shellac are found to be suitable.

Ethylene glycol can be used instead of diethylene glycol and, while not as good a solvent for the shellac, gives with shellac by the process above described generally for diethylene glycol a desirable product suitable for many uses.

The use of polymerized shellac with rubber as described above is given as an illustrative example of the use of polymerized shellac. And it is to be understood that in the use of polymerized shellac in rubber, the rubber can have other materials added thereto such as are generally used in the practice of rubber goods manufacture. For example, the following is an illustrative formula for a rubber mixture for general use:

| | Parts by weight |
|---|---|
| Polymerized shellac | 4 |
| Rubber | 1 |

3% of the above total weight in sulphur,
3% of the above total weight in zinc oxide,
½% of the above total weight in hexamethylene tetramine, milled together on the mixing rolls.

The polymerized shellac of this formula can be any of the polymerized shellac materials above described including also those in which diethylene glycol and ethylene glycol are used.

Any of the above described polymerized shellacs, that is with or without the glycols, can be sheeted out and calendared on cloth for general use such as rubber coated cloths are used, and an example of a particular use is for printing blankets, and also the rubber-polymerized shellac compositions can be used in the same or similar ways. It will be clear that pigments and fillers can also be used such as is the general practice in the use of rubber.

Another example of the use of any of the above materials, mixtures and compositions involving the materials of the present invention is for floor covering in sheet or tile form, with or without the use of rubber, and in each case with or without the use of fillers and pigments such as cork, iron oxide, slate dust, zinc oxide and the fillers and pigments and colorings generally used in making floor coverings from rubber.

Having thus described my invention, what I claim as new and desire to protect by Letters Patent is:

1. The method which comprises heating a solution of shellac and a dialkyl sulphate in an ethylene glycol until a condition is reached in which the product is workable on mixing rolls.

2. The method which comprises heating a solution of shellac and diethyl sulphate in di-ethylene glycol until a condition is reached in which the product is workable on mixing rolls.

3. A product which is workable on mixing rolls and is a heat reaction product of a solution of shellac in di-ethylene glycol in contact with diethyl sulphate.

4. The method which comprises heating a solution of shellac and a hydrocarbon sulphate in material selected from the group consisting of ethylene glycol and di-ethylene glycol until a condition is reached in which the product is workable on mixing rolls.

5. The method which comprises heating a solution of shellac and an alkyl sulphate in material selected from the group consisting of ethylene glycol and di-ethylene glycol until a condition is reached in which the product is workable on mixing rolls.

6. A product which is workable on mixing rolls and is a heat reaction product of a solution of shellac and material selected from the group consisting of ethylene glycol and di-ethylene glycol in contact with a hydrocarbon sulphate.

SOLOMON CAPLAN.